United States Patent Office 2,848,496
Patented Aug. 19, 1958

2,848,496

DIMERISATION OF KETENE IN MEDIUM OF DIKETENE AND ACETIC ANHYDRIDE

Richard Norman Lacey, Hull, England, assignor to The Distillers Company Limited, Edinburgh, Scotland, a British company No Drawing. Application August 30, 1956
Serial No. 606,960

Claims priority, application Great Britain
September 15, 1955

8 Claims. (Cl. 260—585.5)

The present invention relates to an improved process for the production of diketene.

The conversion of ketene to diketene in a medium consisting predominantly of diketent is well known. One such process consists in feeding ketene, derived for instance from the pyrolysis of acetic acid, into an absorber containing diketene. The resulting solution of ketene in diketene is passed to one or more dimerisation vessels, usually provided with heat exchangers to remove the heat of dimerisation, where the ketene concentration is allowed to fall to zero. The diketene produced is removed and the remaining diketene is recycled to the absorber where the procedure is repeated.

It is an object of the present invention to provide a process which gives improved yields of diketene.

According to the present invention, the process for the production of diketene from ketene comprises subjecting ketene to dimerising conditions in a medium comprising diketene and acetic anhydride and removing the heat of dimerisation.

The proportion of acetic anhydride present in the medium may vary within wide limits, but it is preferred to use a medium containing at least 50% by weight and preferably from 60 to 70% by weight of acetic anhydride. In a preferred embodiment of the invention a predetermined ratio of dikene to acetic anhydride is maintained in the medium by the continuous addition of acetic anhydride as the ketene is converted to diketene.

The proportion of ketene introduced into the diketene-acetic anhydride medium is also not critical. If desired an excess of ketene can be added so that the medium remains saturated with ketene in order to obtain the maximum conversion velocity. In one preferred embodiment the diketene-acetic anhydride medium is treated with ketene in an absorbing vessel maintained at a comparatively low temperature, at which the solubility of ketene is higher, to reach a concentration of 4% by weight of ketene and the mixture is passed through one or more dimerisation vessels maintained at higher temperatures in which the ketene concentration is allowed to fall to zero.

The dimerisation reaction will take place within a fairly wide temperature range and temperatures between 0° and 70° C. have been found to be suitable. It is preferred, however, to carry out the reaction at a temperature in the range from 10° to 40° C.

The process of the invention can be carried out in a number of ways, and can be adapted for either batchwise or continuous operation. However, it is preferred to operate the process continuously. In one preferred embodiment the reaction is carried out in a reactor provided with means for stirring the contents and with a heat exchanger for controlling the temperature of the reactor contents. Ketene, generated preferably by the pyrolysis of acetic acid, is passed into the reactor which contains the medium of diketene and acetic anhydride, and the diketene product is withdrawn at a rate equal to that of its formation from the ketene. Desirably acetic anhydride is added continuously to the medium to maintain the diketene to acetic anhydride ratio at a constant level. The diketene product is passed to a vessel where it is maintained at a temperature between 10° and 40° C., in which the ketene concentration is allowed to fall substantially to zero and then is fractionated to recover the diketene in a pure state; the acetic anhydride so separated may be recycled to the reactor.

In a second preferred embodiment a circulating system consists of an absorbing vessel connected with one or more dimerisation vessels arranged in series. The ketene is fed into th base of the absorbing vessel through which the diketene-acetic anhydride medium is flowing at a temperature of about 0° C. The rate of feeding the ketene is adjusted relative to the rate of flow of the diketene-acetic anhydride medium so as to give a concentration of ketene in the reaction mixture of about 4% by weight. The reaction mixture passes through the dimerisation vessels at a rate adjusted so that the concentration of ketene falls substantially to zero in the last dimerisation vessel of the series. The dimerisation vessels are provided with heat exchangers and maintained at a temperature in the range of about 10° C. to 40° C. Where a series of dimerisation vessels is employed, these may be operated at successively higher temperatures so as to achieve the highest reaction rates consistent with the solubility-temperature limitation of ketene in diketene. Acetic anhydride is continuously added to the system at some point to maintain the diketene to acetic anhydride ratio at the desired level. The reaction mixture is continuously removed and fractionated to recover the diketene produced and the acetic anhydride, the latter being recycled to the circulating system.

The following example illustrates the process of the present invention.

EXAMPLE

A reactor, provided with an efficient stirrer, means for the introduction of ketene and diketene-acetic anhydride medium, a thermometer, a condenser and an outlet through which the reaction mixture can be withdrawn, was charged with the diketene-acetic anhydride medium. Ketene generated by the pyrolysis of acetic acid, was passed into the reactor, the temperature of the reaction mixture being maintained at 10° C. Acetic anhydride was continuously added to the vessel to maintain the diketene to acetic anhydride ratio at a constant level; the reaction mixture was withdrawn at frequent intervals and after it had been allowed to stand at a temperature in the range from 10° to 20° C. for two hours to permit substantially complete conversion of the dissolved ketene was fractionated to recover the diketene and the acetic anhydride, the latter being recycled to the reaction vessel.

A number of runs, each of 5 hours' duration, was carried out using different ratios of ketene to acetic anhydride.

The results are given in the Table 1.

Table 1

| Run No. | Average ketene conc. in moles/litre of medium | Percent anhydride by weight | Percent yield of diketene |
| --- | --- | --- | --- |
| 1 | 0.55 | 33.3 | 92.5 |
| 2 | 0.59 | 33.3 | 93.1 |
| 3 | 0.72 | 33.3 | 91.2 |
| 4 | 0.67 | 33.3 | 89.9 |
| 5 | 0.69 | 33.3 | 89.6 |
| 6 | 0.64 | 33.3 | 90.9 |
| 7 | 0.65 | 33.3 | 91.2 |
| 8 | 0.68 | 50.0 | 92.3 |
| 9 | 0.65 | 50.0 | 92.4 |
| 10 | 0.68 | 50.0 | 91.1 |
| 11 | 0.71 | 50.0 | 91.7 |
| 12 | 0.72 | 66.7 | 91.4 |
| 13 | 0.64 | 66.7 | 92.9 |
| 14 | 0.69 | 66.7 | 92.8 |
| 15 | 0.66 | 66.7 | 91.8 |
| 16 | 0.68 | 66.7 | 92.7 |
| 17 | 0.63 | 66.7 | 91.4 |
| 18 | 0.66 | 66.7 | 92.3 |
| 19 | 0.68 | 66.7 | 92.3 |
| 20 | 0.70 | 66.7 | 92.2 |
| 21 | 0.70 | 66.7 | 92.7 |

As a comparison with the runs shown in the above Example 6 runs were carried out in the same apparatus under the same conditions in the absence of acetic anhydride using only diketene as the medium, the results shown in Table 2 being obtained.

Table 2

| Run No. | Average ketene conc. in moles/litre of medium | Percent yield of diketene |
| --- | --- | --- |
| 22 | 0.92 | 87.8 |
| 23 | 0.96 | 89.6 |
| 24 | 0.91 | 87.4 |
| 25 | 0.92 | 88.3 |
| 26 | 0.91 | 86.8 |
| 27 | 0.83 | 83.7 |

I claim:

1. A process for the production of diketene from ketene comprising passing ketene into a reaction mixture consisting of diketene and acetic anhydride, said reaction mixture containing at least 33.3% by weight of acetic anhydride, and removing the heat of dimerisation of the ketene.

2. The process claimed in claim 1 wherein diketene and acetic anhydride are reacted with ketene in an absorbing zone maintained at a temperature below 10° C. and thereafter the reaction mixture is passed through one or more dimerisation zones in which the ketene concentration is allowed to fall substantially to zero, each dimerisation zone being maintained at a temperature of at least 10° C. and the zones being arranged in series with the absorbing zone.

3. The process claimed in claim 1 wherein the reaction mixture contains at least 50% by weight of acetic anhydride.

4. The process claimed in claim 3 wherein the reaction mixture contains from 60 to 70% by weight of the acetic anhydride.

5. The process claimed in claim 1 wherein the reaction is carried out at a temperature in the range from 0° to 70° C.

6. The process claimed in claim 5 wherein the reaction is carried out at a temperature in the range from 10° to 40° C.

7. A process for the production of diketene from ketene comprising passing ketene into a reaction mixture consisting of diketene and acetic anhydride, said reaction mixture containing at least 33.3% by weight of acetic anhydride, withdrawing the diketene so produced at a rate equal to that of its formation from the ketene, adding acetic anhydride continuously to the reaction mixture to maintain the proportion of acetic anhydride present in the reaction mixture, removing the heat of dimerisation of the ketene and thereafter fractionating the diketene to recover diketene in a pure state.

8. The process claimed in claim 7 wherein acetic anhydride separated from the withdrawn diketene during the recovery of pure diketene is recycled to the reaction mixture.

References Cited in the file of this patent
UNITED STATES PATENTS 2,216,450　Mugdan et al. _____ Oct. 1, 1940
2,688,640　Schnegg _____ Sept. 7, 1954